United States Patent
Bell

[15] 3,702,369
[45] Nov. 7, 1972

[54] SILICON CARBIDE FURNACE

[72] Inventor: John Bell, Chippawa, Ontario, Canada

[73] Assignee: Norton Company, Worcester, Mass.

[22] Filed: Jan. 7, 1971

[21] Appl. No.: 104,622

[52] U.S. Cl. ......................................... 13/20, 13/25
[51] Int. Cl. ........................................... H05b 3/60
[58] Field of Search ..................... 13/20, 22, 25, 23

[56] References Cited

UNITED STATES PATENTS

| 757,620 | 4/1904 | Horry | 13/20 X |
| 1,427,814 | 9/1922 | Horstkotte | 13/20 |
| 1,864,885 | 6/1932 | Bellis | 13/20 X |

*Primary Examiner*—Roy N. Envall, Jr.
*Attorney*—Allan R. Redrow

[57] ABSTRACT

This invention relates generally to furnaces which are useful in the production of silicon carbide, and particularly to an improved manner of supporting and locating the electrodes utilized in such furnaces.

3 Claims, 2 Drawing Figures

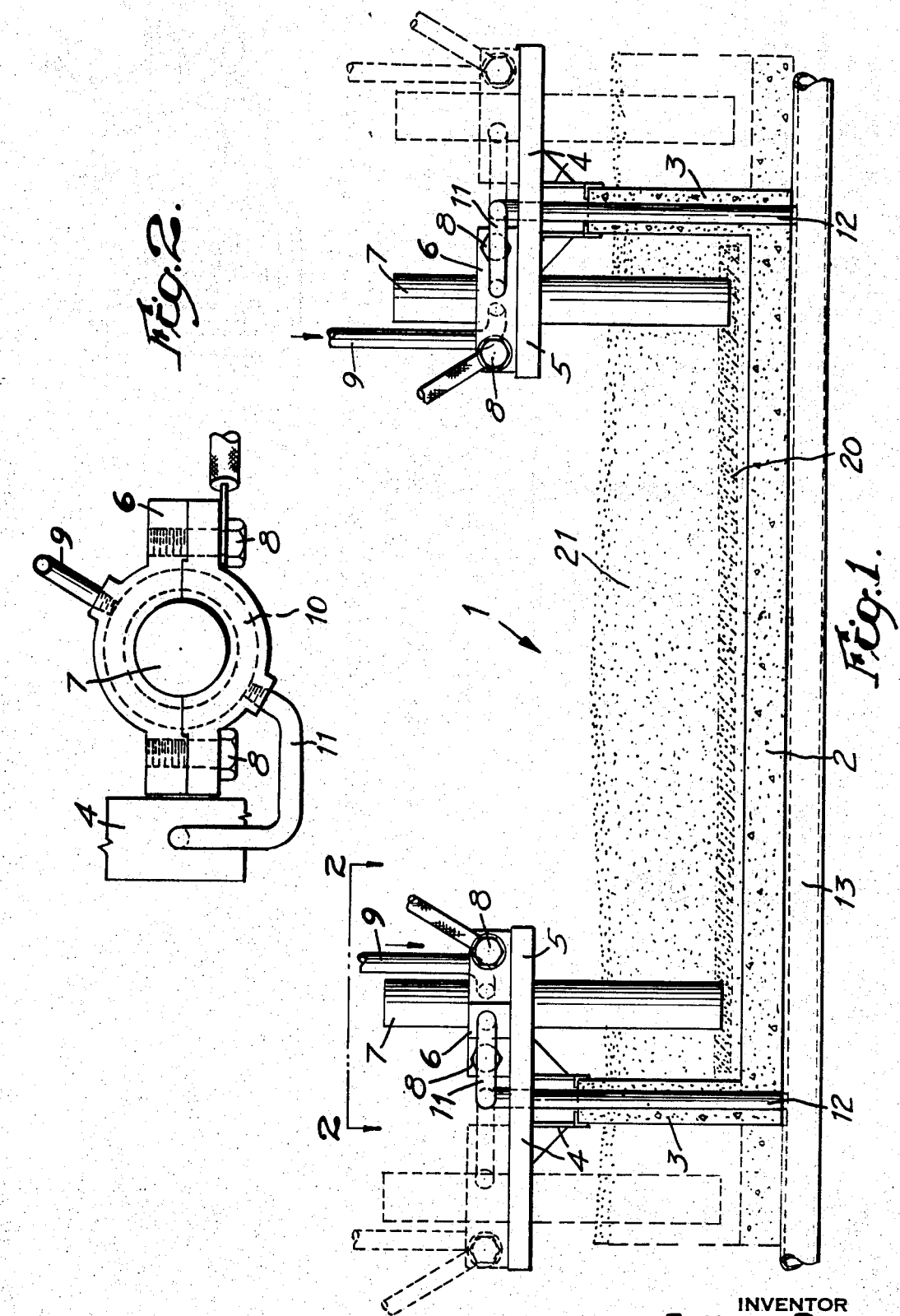

SILICON CARBIDE FURNACE

BACKGROUND OF THE INVENTION

Silicon carbide is manufactured by heating together a mixture of sand (silicon dioxide) with an excess of coke (carbon) in an electric furnace, according to the following equation:

$$SiO_2 + 3C \rightarrow SiC + 2CO.$$

The conventional silicon carbide production furnace is basically identical to that shown and described in U.S. Pat. No. 722,792 and is generally known as the Acheson electric furnace. In that furnace a horizontal core of granulated coke or graphite, surrounded by a mixture of sand, finely-divided coke and sawdust, is placed between two electrodes protruding through the end walls of the furnace. The core of granulated coke or graphite conducts the electric current between the two electrodes, and a current is passed through the furnace for several hours. The resultant high temperatures (up to 3,000° C) melts the silica and causes the above-defined reaction to occur. When the reaction is completed, the mass is allowed to cool, and is subsequently broken up, washed and sorted. That part of the furnace charge occupying the space between the electrodes and surrounding the core is converted into silicon carbide in the form of agglomerations or a pig of hard blue-black crystals, which may be crushed into grain form to be widely used as an abrasive.

In conventional practice the end walls of the furnace are formed of concrete and may be lined with firebrick. The electrodes are sealed into and extend through the end walls of the furnace. The end walls usually consist of a vertical concrete structure with the horizontal electrode or electrodes centrally placed in the wall, packed in carbon paste and protruding into the furnace. The side walls which together with the end walls and floor of the furnace define the reaction chamber, are preferably cast iron gates that pivot about horizontal hinges fixed to the floor. The reaction mass described above is piled into the chamber formed by the end walls, floor, and raised side gate elements. The reaction mass supports a centrally disposed carbon electrode in contact with ends of the electrodes supported in the end walls.

During operation of the furnace, electric power passes through the electrodes in the end walls, generating considerable heat which causes the concrete and fire brick forming the end walls to deteriorate, and the carbon paste to oxidize. This deterioration necessitates the frequent repair and eventual replacement of the end walls of the furnace with the resulting expensive replacement and maintenance costs for this type of furnace.

SUMMARY OF THE INVENTION

In contrast, the present invention provides a structure for suspending the electrodes from above the furnace with their lower end in the reaction chamber, and spaced from the end walls a distance sufficient to permit a portion of the reaction mix to insulate the end wall from the heat of the reaction in order to minimize damage to the end walls and eliminate the possibility of causing heat produced by the electrodes passing through the walls from unduly heating these walls during operation of the furnace.

According to the present invention my electric furnace comprises a body structured to define a basin or reaction chamber for holding material to be reacted, an electrode support assembly adapted for mounting in operable relationship with said furnace, said assembly including an electrode holding section which is so structured for maintaining electrodes in selected position within said furnace in contact with material to be reacted and in predetermined spaced relationship from the body structure of the furnace.

In a preferred embodiment, the carbonaceous electrode is suspended from a frame attached to a concrete pier which forms an end wall for the furnace. The electrode extends downwardly from the frame into the furnace charge making contact with a core of granulated coke or graphite that extends from one electrode to the other. The point of suspension of the electrode is such that the electrode is a sufficient distance from the end pier so that temperatures at the inner face of the end wall are not excessive and, therefore, do not significantly contribute to premature deterioration of the furnace at least in comparison with previous arrangements.

The electrode itself may suitably be formed of either carbon or graphite, and its life can be extended by reducing the oxidation of the electrode which occurs during furnace operation. For example, a refractory coating may be applied to the surface of the electrode. Alternatively, and in accordance with a preferred practice of this invention, cooling fluid may be circulated around or through the electrical connector for delivering current to the electrode. Worn electrodes may be simply and easily replaced since they are not encased in the end wall of the furnace.

A further advantage of the present invention, resulting from the suspension of the electrodes from above, as previously taught herein, is that the electrodes can be suspended on both sides of a concrete pier. This allows the same pier to act as an end wall for two furnaces disposed in end-to-end relationship. Thus a number of furnaces can be located in end-to-end relationship, with the concrete piers other than those on the outside ends, acting as an end wall which is a common wall to separate furnaces disposed on each side thereof. Common connections and the proximity of the electrodes simplify construction, maintenance and operation.

It is clear that an electric silicon carbide furnace constructed in accordance with the present invention overcomes disadvantages inherent in the use of conventional furnaces by reducing the costs of construction, maintenance and operation, and accordingly fills a long-felt need in the industry generally.

A specific embodiment of a silicon carbide furnace embodying the features of this invention will now be described. This specific description is included to facilitate a complete understanding of the invention and one manner of putting it into practice. It should not be construed as limiting the scope of the invention as defined in the appended claims.

BRIEF DESCRIPTION OF THE DRAWING

Reference will now be made to the accompanying drawings in which:

FIG. 1 is a side view of a silicon carbide furnace (with the side walls removed for clarity) constructed in accordance with the present invention.

FIG. 2 is a top view taken along line 2—2 of FIG. 1 illustrating details of the electrode support structure.

DESCRIPTION OF THE PREFERRED EMBODIMENTS

Referring now to FIG. 1, reference numeral 1 generally indicates a silicon carbide furnace that has a bottom floor 2 and end walls 3. Situated on top of end walls 3 is a T-shaped supporting member 4 which has lateral, horizontal extensions 5 overhanging the furnace basin or reaction area. Supported on the top surfaces of each of the extensions 5 is an electrode support and clamp 6 comprised of two co-operating hollow jaws which are held together and grip electrodes 7 by tightening bolts 8. The electrodes 7 may be adjusted vertically or removed and replaced by loosening or removing bolts 8. A connecting pipe 9 provides a flow of cooling fluid (i.e. water) to one element of each of the hollow electrode supports, the two halves being sealed together to provide a channel 10 in each support for circulating the coolant around the electrode clamp. Conduit 11 carries the fluid from the channels 10 in supports 6 to the concrete end piers 3 of the furnace basin where it flows down through conduit 12. The coolant passes through end walls 3 and thence to a collecting header 13 running under the floor of the furnace.

In operation, the furnace is filled with material 21 to be reacted, with a core of granulated coke or graphite 20 running through the reactants and connecting the bottoms of the two electrodes 7 together. This completes the circuit and permits passage of the heat-generating electric current through the reactants in the furnace, in a conventional manner. The electrodes are connected by suitable means (not shown) to an electric power supply, and are adjustable vertically in clamps 6 to vary the position of core 20 and to compensate for erosion of the electrodes through use.

As mentioned previously, an advantage of the present invention lies in the fact that the concrete pier 3 which forms an end wall for furnace 1 may also serve as the end wall for an adjacent furnace, or series of furnaces placed in end-to-end relationship may utilize common end walls. This feature is illustrated in FIG. 1 by showing the structure of two furnaces adjoining furnace 1 at each end in dotted lines. The electrode structure and the construction of the adjoining furnaces, as illustrated, is identical to that already described for furnace 1, and further detail is not necessary for a complete understanding of the invention.

In the drawings, furnace 1 is shown with the side wall of the furnace reaction chamber removed, in order to better illustrate the construction and operation of the electrode support for the furnace. The two side walls are preferably formed of a plurality of cast iron sections or gates (not illustrated) which are hinged at the bottom. The gates may be lifted and locked in a generally upright position to form the side walls of the furnace prior to filling the furnace with the materials to be reacted. After the reaction has been completed, the side wall sections are lowered, and a portion of the unreacted mix immediately adjacent to the walls which serves to insulate the side walls from the heat of the reaction, is permitted to spill out on the floor. This overflowing of unreacted material leaves the elongated reacted silicon carbide "pig" exposed within the furnace. The reacted material is accordingly readily accessible and may be removed and broken up.

It is, therefore, contemplated that the benefits of the present invention will be enjoyed by the public generally by more efficient future furnace processing in the field envisaged herein.

What is claimed is:

1. An electric furnace, for the production of silicon carbide, comprising:
    a. an elongated horizontally disposed body structured to define a reaction chamber for containing material to be reacted;
    b. said body having removable side walls and fixed end walls at the opposite ends of the elongated chamber;
    c. electrode support assembly means mounted on each of said end walls in a position well above the reaction chamber but in operable relationship with said furnace;
    d. vertically extending electrodes carried by said support means to extend downwardly into the reaction chamber at each end thereof adjacent to the respective end walls;
    e. said electrode support assembly means each including an electrode holding section which is structured for maintaining an electrode in said selected vertical position within said furnace in contact with material to be reacted and in predetermined spaced and non-touching relationship with the side and end wall structures of said furnace body.

2. An electric furnace as defined in claim 1 wherein said electrode support is mounted on one of said walls and includes a generally lateral portion which extends over the furnace chamber and grips the electrode such that the electrode extends into the materials to be reacted from above.

3. An electric furnace as defined in claim 2 wherein a second furnace is positioned adjacent said furnace and said electrode support includes a second lateral portion which extends in a direction generally opposite to said first named lateral portion, and which can support a second electrode such that it extends into the reaction chamber of said second furnace.

* * * * *